(12) United States Patent
Ford et al.

(10) Patent No.: US 6,271,321 B1
(45) Date of Patent: Aug. 7, 2001

(54) PROCESS FOR PRODUCING POLYETHYLENE

(75) Inventors: Randal Ray Ford; William Albert Ames; Kenneth Alan Dooley; Jeffrey James Vanderbilt; Alan George Wonders, all of Longview, TX (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 09/251,969

(22) Filed: Feb. 17, 1999

Related U.S. Application Data

(60) Provisional application No. 60/075,106, filed on Feb. 18, 1998.

(51) Int. Cl.⁷ ............................................. C08F 4/16
(52) U.S. Cl. ......................... 526/123.1; 526/124.3; 526/125.1; 526/125.3; 526/128; 526/124.7; 526/352; 502/104
(58) Field of Search ............... 526/123.1, 124.3, 526/125.1, 125.3, 128, 124.7, 348.6, 352; 502/104

(56) References Cited

U.S. PATENT DOCUMENTS

| | | |
|---|---|---|
| Re. 33,683 | 9/1991 | Allen et al. . |
| 3,113,115 | 12/1963 | Ziegler et al. . |
| 3,354,139 * | 11/1967 | Vandenberg ......................... 260/94.9 |
| 3,594,330 | 7/1971 | Delbouille et al. . |
| 3,644,318 | 2/1972 | Diedrich et al. . |
| 3,676,415 | 7/1972 | Diedrich et al. . |
| 3,709,853 | 1/1973 | Karapinka . |
| 3,917,575 | 11/1975 | Matsuura et al. . |
| 4,003,712 | 1/1977 | Miller . |
| 4,011,382 | 3/1977 | Levine et al. . |
| 4,012,573 | 3/1977 | Trieschmann et al. . |
| 4,076,698 | 2/1978 | Anderson et al. . |
| 4,105,847 | 8/1978 | Ito et al. . |
| 4,148,754 | 4/1979 | Strobel et al. . |
| 4,187,385 | 2/1980 | Iwao et al. . |
| 4,256,866 | 3/1981 | Karayannis et al. . |
| 4,293,673 | 10/1981 | Hamer et al. . |
| 4,296,223 | 10/1981 | Berger . |
| 4,298,713 | 11/1981 | Morita et al. . |
| 4,302,565 | 11/1981 | Goeke et al. . |
| 4,302,566 | 11/1981 | Karol et al. . |
| 4,311,752 | 1/1982 | Diedrich et al. . |
| 4,363,904 | 12/1982 | Fraser et al. . |
| 4,481,301 | 11/1984 | Nowiis et al. . |
| 4,543,399 | 9/1985 | Jenkins et al. . |
| 4,684,703 | 8/1987 | Wagner et al. . |
| 4,701,505 | 10/1987 | Fujii et al. . |
| 4,882,400 | 11/1989 | Dumain et al. . |
| 4,981,930 * | 1/1991 | Funabashi et al. ................... 526/142 |
| 5,055,535 * | 10/1991 | Spitz et al. ........................... 526/142 |
| 5,204,303 * | 4/1993 | Korvenoja et al. ...................... 502/9 |
| 5,352,749 | 10/1994 | DeChellis et al. . |
| 5,410,002 | 4/1995 | Govoni et al. . |
| 5,414,063 * | 5/1995 | Seeger et al. ............................ 526/88 |
| 5,432,139 * | 7/1995 | Shamshoum et al. ................ 502/125 |
| 5,470,812 | 11/1995 | Mink et al. . |
| 5,541,270 | 7/1996 | Chinh et al. . |
| 5,556,820 * | 9/1996 | Funabashi et al. ................... 502/111 |
| 5,658,840 * | 8/1997 | Kolle et al. ........................... 502/104 |
| 5,773,535 * | 6/1998 | Friedrich et al. ................. 526/124.6 |
| 6,034,189 * | 3/2000 | Shinozaki et al. ................ 526/125.3 |

FOREIGN PATENT DOCUMENTS

| | | |
|---|---|---|
| 592394 | 6/1987 | (AU) . |
| 839380 | 9/1976 | (BE) . |
| 991798 | 6/1976 | (CA) . |
| 0 197 311 | 10/1986 | (EP) . |
| 0 703 246 A1 | 3/1996 | (EP) . |
| 0 719 800 | 7/1996 | (EP) . |
| 0 529 977 B1 | 4/1998 | (EP) . |

OTHER PUBLICATIONS

Chemical and Engineering News, 63 (5), 27, 1985.
Patent Abstracts of Japan, vol. 012, No. 410 (C–540), Oct. 28, 1988 and JP 63 146905 A (Idemitsu Petrochem Co., Ltd.), Jun. 18, 1988.
Derwent Publications Ltd., London, GB; AN 1992–060096 XP002122115 & JP 04 004206 A (Mitsubishi Petrochemical Co. Ltd.), Jan. 8, 1992.

* cited by examiner

*Primary Examiner*—Peter D. Mulcahy
*Assistant Examiner*—R. Harlan
(74) *Attorney, Agent, or Firm*—Jonathan D. Wood; Bernard J. Graves, Jr.

(57) ABSTRACT

A novel process for producing homopolymers and copolymers of ethylene which involves contacting ethylene and/or ethylene and at least one or more other olefin(s) under polymerization conditions with a Ziegler-Natta type catalyst containing at least one or more internal electron donors, trimethylaluminum and at least one or more external electron donors containing at least one carbon-oxygen-carbon linkage (C—O—C) selected from the group consisting of Formula 1, $$R^1-CH_2-O-CH_2-R^2,$$

Formula 2,

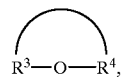

Formula 3, $$R^5-O-R^6,$$

and Formula 4, $$R^7-O(-R^8-O)_n-R^9.$$

Also provided are films and articles produced therefrom.

25 Claims, No Drawings

PROCESS FOR PRODUCING POLYETHYLENE

CROSS-REFERENCE TO RELATED APPLICATION

This application claims priority under 35 U.S.C. §119(e) to U.S. provisional application Ser. No. 60/075,106, filed Feb. 18, 1998.

FIELD OF INVENTION

The present invention relates to a polymerization process for the production of a polyethylene and films produced from the polyethylene.

BACKGROUND OF INVENTION

Polyethylene polymers are well known and are useful in many applications. In particular, linear polyethylene polymers possess properties which distinguish them from other polyethylene polymers, such as branched ethylene homopolymers commonly referred to as LDPE (low density polyethylene), Certain of these properties are described by Anderson et al, U.S. Pat. No. 4,076,698.

A particularly useful polymerization medium for producing polyethylene polymers is a gas phase process. Examples of such are given in U.S. Pat. Nos. 3,709,853; 4,003,712; 4,011,382; 4,302,566; 4,543,399; 4,882,400; 5,352,749 and 5,541,270 and Canadian Patent No. 991,798 and Belgian Patent No. 839,380.

Ziegler-Natta type catalyst systems for the polymerization of olefins are well known in the art and have been known at least since the issuance of U.S. Pat. No. 3,113,115. Thereafter, many patents have been issued relating to new or improved Ziegler-Natta type catalysts. Exemplary of such patents are U.S. Pat. Nos. 3,594,330; 3,676,415; 3,644,318; 3,917,575; 4,105,847; 4,148,754; 4,256,866; 4,298,713; 4,311,752; 4,363,904; 4,481,301 and U.S. Pat. No. Re. 33,683.

These patents disclose Ziegler-Natta type catalysts that are well known as typically consisting of a transition metal component and a co-catalyst that is typically an organoaluminum compound. Optionally used with the catalyst are activators such as halogenated hydrocarbons and activity modifiers such as electron donors.

The use of halogenated hydrocarbons with Ziegler-Natta type polymerization catalysts in the production of polyethylene is disclosed in U.S. Pat. No. 3,354,139 and European Patent Nos. EP 0 529 977 B1 and EP 0 703 246 A1. As disclosed, the halogenated hydrocarbons may reduce the rate of ethane formation, improve catalsyt efficiency, or provide other effects. Typical of such halogenated hydrocarbons are monohalogen and polyhalogen substituted saturated or unsaturated aliphatic, alicyclic, or aromatic hydrocarbons having 1 to 12 carbon atoms. Exemplary aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, 1,2-dichloroethane, 1,2-dibromoethane, methylchloroform, perchloroethylene and the like. Exemplary alicyclic compounds include chlorocyclopropane, tetrachlorocyclopentane and the like. Exemplary aromatic compounds include chlorobenzene, hexabromobenzene, benzotrichloride and the like. These compounds may be used individually or as mixtures thereof.

It is also well known, in the polymerization of olefins, particularly where Ziegler-Natta type catalysts are employed, to utilize, optionally, electron donors. Such electron donors often aid in increasing the efficiency of the catalyst and/or in controlling the stereospecificity of the polymer when an olefin, other than ethylene, is polymerized. Electron donors, typically known as Lewis Bases, when employed during the catalyst preparation step are referred to as internal electron donors. Electron donors when utilized other than during the catalyst preparation step are referred to as external electron donors. For example, the external electron donor may be added to the preferred catalyst, to the prepolymer, and/or to the polymerization medium.

The use of electron donors in the field of propylene polymerization is well known and is primarily used to reduce the atactic form of the polymer and increase the production of the isotactic polymers. The use of electron donors generally improves the productivity of the catalyst in the production of isotactic polypropylene. This is shown generally in U.S. Pat. No. 4,981,930.

In the field of ethylene polymerization, where ethylene constitutes at least about 70% by weight of the total monomers present in the polymer, electron donors are utilized to control the molecular weight distribution (MWD) of the polymer and the activity of the catalyst in the polymerization medium. Exemplary patents describing the use of internal electron donors in producing linear polyethylene are U.S. Pat. Nos. 3,917,575; 4,187,385, 4,256,866; 4,293,673; 4,296,223; U.S. Pat. No. Re. 33,683; U.S. Pat. Nos. 4,302, 565; 4,302,566; and 5,470,812. The use of an external monoether electron donor, such as tetrahydrofuran (THF), to control molecular weight distribution is shown in U.S. Pat. No. 5,055,535; and the use of external electron donors to control the reactivity of catalyst particles is described in U.S. Pat. No. 5,410,002.

Illustrative examples of electron donors include carboxylic acids, carboxylic acid ester, alcohols, ethers, ketones, amines, amides, nitriles, aldehydes, thioethers, thioesters, carbonic esters, organosilicon compounds containing oxygen atoms, and phosphorus, arsenic or antimony compounds connected to an organic group through a carbon or oxygen atom.

SUMMARY OF THE INVENTION

The polymerization process of the present invention comprises the introduction into a polymerization medium containing ethylene and optionally other olefin(s), a Ziegler-Natta type polymerization catalyst containing at least one or more internal electron donor in an amount represented by a molar ratio of internal electron donor to transition metal compound of the Ziegler-Natta type catalyst of from 1:1 to about 1000:1, trimethylaluminium (TMA) as a co-catalyst, and at least one or more external electron donor compound containing at least one carbon-oxygen-carbon linkage (C—O—C) of Formula 1:

or Formula 2:

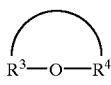

or Formula 3:

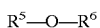

or Formula 4:

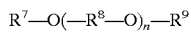

where n ranges from 1 to 30;

$R^1$ and $R^2$ are independently selected from the group consisting of hydrogen, saturated and unsaturated aliphatic groups containing from 1 to 30 carbon atoms and from 0 to 30 heteroatoms of an element, or mixtures thereof, selected from Groups 13, 14, 15, 16 and 17 of the Periodic Table of Elements, and substituted and unsubstituted aromatic groups containing from 1 to 30 carbon atoms and from 0 to 30 heteroatoms of an element, or mixtures thereof, selected from the Groups 13, 14, 15, 16 and 17 of the Periodic Table of Elements;

$R^3$ and $R^4$ are linked and form part of a cyclic or polycyclic structure and are hydrocarbons independently selected from the group consisting of saturated and unsaturated aliphatic groups containing from 1 to 30 carbon atoms and from 0 to 30 heteroatoms of an element, or mixtures thereof, selected from Groups 13, 14, 15, 16 and 17 of the Periodic Table of Elements, and substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of Elements;

$R^5$ is selected from the group consisting of substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of Elements;

$R^6$, $R^7$, $R^8$ and $R^9$ are independently selected from the group consisting of saturated and unsaturated aliphatic groups containing from 1 to 30 carbon atoms and from 0 to 30 heteroatoms of an element, or mixtures thereof, selected from Groups 13, 14, 15, 16 and 17 of the Periodic Table of Elements, and substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of Elements.

Mixtures of compounds of Formulas 1, 2, 3 and 4 can also be used as the external electron donor herein.

Optionally a halogenated hydrocarbon compound can be employed in the polymerization medium. The external electron donor as defined herein and/or the TMA may be added to the polymerization medium in any manner. The external electron donor as defined herein and/or the TMA may be added to the catalyst just prior to addition to the polymerization medium, or added separately from the catalyst to the polymerization medium in any manner known in the art. For example, the external electron donor as defined herein may optionally be premixed with the TMA co-catalyst.

If a gas phase fluidized bed process is utilized for polymerization of the ethylene, it may be advantageous to add the external electron donor as defined herein prior to the heat removal means, e.g., the heat exchanger, to slow the rate of fouling of said heat removal means.

All mention herein to elements of Groups of the Periodic Table are made in reference to the Periodic Table of the Elements, as published in "Chemical and Engineering News", 63(5), 27, 1985. In this format, the Groups are numbered 1 to 18.

DETAILED DESCRIPTION OF THE INVENTION

The present inventors have discovered an improved process for producing polyethylene. The process involves the unexpected discovery of the use of a particular combination of a Ziegler-Natta catalyst containing at least one or more internal electron donor in an amount represented by a molar ratio of internal electron donor to transition metal compound of the Ziegler-Natta type catalyst of from 1:1 to about 1000:1, trimethylaluminum (TMA) co-catalyst and at least one or more external electron donor compound containing at least one carbon-oxygen-carbon linkage (C—O—C) of Formula 1:

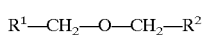

of Formula 2:

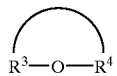

of Formula 3:

of Formula 4:

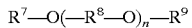

where n ranges from 1 to 30;

$R^1$ and $R^2$ are independently selected from the group consisting of hydrogen, saturated and unsaturated aliphatic groups containing from 1 to 30 carbon atoms and from 0 to 30 heteroatoms of an element, or mixtures thereof, selected from Groups 13, 14, 15, 16 and 17 of the Periodic Table of Elements, and substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of Elements;

$R^3$ and $R^4$ are linked and form part of a cyclic or polycyclic structure and are hydrocarbons independently selected from the group consisting of saturated and unsaturated aliphatic groups containing from 1 to 30 carbon atoms and from 0 to 30 heteroatoms of an element, or mixtures thereof, selected from Groups 13, 14, 15, 16 and 17 of the Periodic Table of Elements, and substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of Elements;

$R^5$ is selected from the group consisting of substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of Elements;

$R^6$, $R^7$, $R^8$ and $R^9$ are independently selected from the group consisting of saturated and unsaturated aliphatic groups containing from 1 to 30 carbon atoms and from 0 to 30 heteroatoms of an element, or mixtures thereof, selected from Groups 13, 14, 15, 16 and 17 of the Periodic Table of Elements, and substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of Elements.

Mixtures of compounds of Formulas 1, 2, 3 and 4 can also be used as the external electron donor herein.

Exemplary of the $R^1$ and $R^2$ groups suitable for use herein are hydrogen, $C_{1\text{-}30}$ alkyl, $C_{2\text{-}30}$ alkenyl, $C_{4\text{-}30}$ dienyl, $C_{3\text{-}30}$ cycloalkyl, $C_{3-30}$ cycloalkenyl, $C_{4-30}$ cyclodienyl, $C_{6-30}$ aryl, $C_{7-30}$ aralkyl and $C_{7-30}$ alkaryl. Also exemplary are hydrocarbons containing from 1 to 30 carbon atoms and from 1 to 30 heteroatoms of an element, or mixtures thereof, from Groups 13, 14, 15, 16 and 17 of the Periodic Table of Elements such as, for example, $B_{1-30}$ borohydrocarbons, $Si_{1-30}$ silahydrocarbons, $P_{1-30}$ phosphahydrocarbons, $S_{1-30}$ thiahydrocarbons, $Cl_{1-30}$ chlorohydrocarbons and halogenated hydrocarbons containing mixtures of halogens.

Exemplary of the $R^3$ and $R^4$ hydrocarbon group suitable for use herein are $C_{1-30}$ alkyl, $C_{2-30}$ alkenyl, $C_{4-30}$ dienyl, $C_{3-30}$ cycloalkyl, $C_{3-30}$ cycloalkenyl, $C_{4-30}$ cyclodienyl, $C_{6-30}$ aryl, $C_{7-30}$ aralkyl and $C_{7-30}$ alkaryl where $R^3$ and $R^4$ are linked and form part of a cyclic or polycyclic structure. Also exemplary are hydrocarbons containing from 1 to 30 carbon atoms and from 1 to 30 heteroatoms of an element, or mixtures thereof, from Groups 13, 14, 15, 16 and 17 of the Periodic Table of Elements such as, for example, $B_{1-30}$ borohydrocarbons, $Si_{1-30}$ silahydrocarbons, $P_{1-30}$ phosphahydrocarbons, $S_{1-30}$ thiahydrocarbons, $Cl_{1-30}$ chlorohydrocarbons and halogenated hydrocarbons containing mixtures of halogens, where $R^3$ and $R^4$ are linked and form part of a cyclic or polycyclic structure.

Exemplary of the $R^5$ group suitable for use herein are $C_{6-30}$ aryl and $C_{7-30}$ aralkyl. Also exemplary are substituted and unsubstituted aromatic hydrocarbons containing from 1 to 30 carbon atoms and from 1 to 30 heteroatoms of an element, or mixtures thereof, from Groups 13, 14, 15, 16 and 17 of the Periodic Table of Elements such as, for example, $B_{1-30}$ borohydrocarbons, $Si_{1-30}$ silahydrocarbons, $P_{1-30}$ phosphahydrocarbons, $S_{1-30}$ thiahydrocarbons, $Cl_{1-30}$ chlorohydrocarbons and halogenated hydrocarbons containing mixtures of halogens.

Exemplary of the $R^6$, $R^7$, $R^8$, and $R^9$ groups suitable for use herein are $C_{1-30}$ alkyl, $C_{2-30}$ alkenyl, $C_{4-30}$ dienyl, $C_{3-30}$ cycloalkyl, $C_{3-30}$ cycloalkenyl, $C_{4-30}$ cyclodienyl, $C_{6-30}$ aryl, $C_{7-30}$ aralkyl and $C_{7-30}$ alkaryl. Also exemplary are hydrocarbons containing from 1 to 30 carbon atoms and from 1 to 30 heteroatoms of an element, or mixtures thereof, from Groups 13, 14, 15, 16 and 17 of the Periodic Table of Elements such as, for example, $B_{1-30}$ borohydrocarbons, $Si_{1-30}$ silahydrocarbons, $P_{1-30}$ phosphahydrocarbons, $S_{1-30}$ thiahydrocarbons, $Cl_{1-30}$ chlorohydrocarbons and halogenated hydrocarbons containing mixtures of halogens.

Exemplary of compounds of Formula 1, $R^1$—$CH_2$—O—$CH_2$—$R^2$, that may be used herein are compounds containing one C—O—C linkage such as alkyl, alkenyl, dienyl and aryl substituted compounds. Specific examples are dimethyl ether; diethyl ether; dipropyl ether; dibutyl ether; dipentyl ether; diisoamyl ether; dihexyl ether; dioctyl ether; dibenzyl ether; diallyl ether; allyl methyl ether; allyl ethyl ether; allyl benzyl ether; benzyl methyl ether; benzyl ethyl ether, butyl methyl ether; butyl ethyl ether; isoamyl methyl ether; isoamyl ethyl ether; isoamyl propyl ether; isoamyl butyl ether and the like. Also exemplary of hydrocarbons of Formula 1 containing heteroatoms from Groups 13, 14, 15, 16 and 17 of the Periodic Table of Elements are bis(trimethylsilylmethyl)ether; trimethylsilylmethyl methyl ether; bis(2,2,2-trifluoroethyl) ether; benzyl 3-bromopropyl ether; benzyl 3-bromo-2-chloropropyl ether; benzyl chloromethyl ether; butyl 2-chloroethyl ether; chloromethyl methyl ether; chloromethyl ethyl ether; dimethyl 2-methoxyethyl borate; dimethyl methoxymethyl borate; dimethoxy-2-methoxyethylborane; diphenyl-2-methoxyethylphosphine; diphenylmethoxymethylphosphine; 2-(2-thienyl)ethyl ethyl ether; 2-(2-thienyl)ethyl methyl ether; 2-(3-thienyl)ethyl ethyl ether; 2-(3-thienyl) ethyl methyl ether; 2-(2-methoxymethyl)-1,3,2-dioxaphospholane; 1-(2-methoxyethyl)pyrrole; 1-(2-methoxyethyl)pyrazole; 1-(2-methoxyethyl)imidazole; 2-(2-methoxyethyl)pyridine and the like.

Exemplary of compounds of Formula 2,

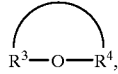

that may be used herein, are cyclic compounds where $R^3$ and $R^4$ are linked and form part of a cyclic or polycyclic structure such as, for example, ethylene oxide; propylene oxide; 1,2-epoxybutane; 2,3-epoxybutane; 1,2-epoxybut-3-ene; cyclopentene oxide; trimethylene oxide; styrene oxide; 3,3-dimethyloxetane; furan; 2,3-dihydrofuran; 2,5-dihydrofuran; tetrahydrofuran; 2-methyltetrahydrofuran; 2,5-dimethyltetrahydrofuran; 4,5-dihydro-2-methylfuran; 2-methylfuran; 2-ethylfuran; 2-tert-butylfuran; 2,5-dimethylfuran; 2,3-dimethylfuran; 1,2-pyran; 1,4-pyran; tetrahydropyran; 3-methyltetrahydropyran; oxocane; 2,3-benzofuran; 2,3-dihydrobenzofuran; 2-methylbenzofuran; phthalan; dibenzofuran; xanthene; chroman; isochroman and the like. Also exemplary are cyclic compounds containing more than one C—O—C linkage such as, for example, 2,5-dimethoxyfuran; 2-methoxyfuran; 3-methoxyfuran; 2-methoxytetrahydropyran; 3-methoxytetrahydropyran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 2-vinyl-1,3-dioxolane; 2-methoxy-1,3-dixolane; 1,4-dioxaspiro[4.4]non-6-ene; 1,4,9,12-tetraoxadispiro (4.2.4.2)tetradecane; 1,3-dioxane; 1,4-dioxane; 4-methyl-1,3-dioxane; 1,3,5-trioxane; 2,4,8,10-tetraoxaspiro(5.5) undecane; 12-crown-4; 15-crown-5; cis-4,7-dihydro-1,3-dioxepin; 1,7-dioxaspiro(5.5)undecane; 3,4-epoxytetrahydrofuran; 2,2-dimethyl-4-vinyl-1,3-dioxolane and the line. Also exemplary of hydrocarbons of Formula 2 containing heteroatoms from Groups 13, 14, 15, 16 and 17 of the Periodic Table of Elements are epichlorohydrin; 3-bromofuran; 2-chloromethyl-1,3-dioxolane; 4-chlorotetrahydropyran; tri-2-furylphosphine; 1-furfurylpyrrole; dimethyl 3-furylmethyl borate; 2-trimethylsilylfuran; 3-trimethylsilylfuran; 2-trimethylsilyl-1,3-dioxolane; 2-(3-thienyl)-1,3-dioxolane; 2-bromochloromethyl-1,3-dioxolane; oxazole; 1,3,4-oxadiazole; 3,4-dichloro-1,2-epoxybutane; 3,4-dibromo-1,2-epoxybutane and the like.

Exemplary of compounds of Formula 3, $R^5$—O—$R^6$, that may be used herein, are compounds containing one C—O—C linkage such as alkyl, alkenyl, dienyl and aryl substituted aromatic compounds. Specific examples are diphenyl ether; bis(2-tolyl) ether; bis(3-tolyl) ether; bis(1-naphthyl) ether; bis(2-naphthyl) ether; allyl phenyl ether; allyl 2-tolyl ether; allyl 3-tolyl ether; allyl 1-naphthyl ether; allyl 2-naphthyl ether; benzyl phenyl ether; benzyl 2-tolyl ether; benzyl 3-tolyl ether; benzyl 1-naphthyl ether; benzyl 2-naphthyl ether; ethyl phenyl ether; ethyl 2-tolyl ether; ethyl 3-tolyl ether; ethyl 1-naphthyl ether; ethyl 2-naphthyl ether; methyl phenyl ether; methyl 2-tolyl ether; methyl 3-tolyl ether; methyl 1-naphthyl ether; methyl 2-naphthyl ether and the like. Also exemplary of hydrocarbons of Formula 3 containing heteroatoms from Groups 13, 14, 15, 16 and 17 of the Periodic Table of Elements are 2-ethoxy-1-methylpyrrole; 3-methoxy-1-methylpyrrole; 2-ethoxythiophene; 3-methoxythiophene; 3-methoxy-1-methylpyrazole; 4-methoxy-1-methylpyrazole; 5-methoxy- 1-methylpyrazole; 2-methoxy-1-methylimidazole; 4-methoxy-1-methylimidazole; 5-methoxy-1-methylimidazole; 3-methoxy-1-phenylpyrazole; 4-methoxy-1-phenylpyrazole; 5-methoxy-1-phenylpyrazole; 2-methoxy-1-phenylimidazole; 4-methoxy-1-phenylimidazole; 5-methoxy-1-phenylimidazole; 4-methoxy-1-methyl-1,2,3-triazole; 5-methoxy-1-methyl-1,2,3-triazole; 4-methoxy-1phenyl-1,2,3-triazole; 5-methoxy-1-phenyl-1,2,3-triazole; 3-methoxy-1-methyl-1,2,4-triazole; 5-methoxy-1-methyl-1,2,4-triazole; 3-methoxy-1-phenyl-1,2,4-triazole; 5-methoxy-1-phenyl-1,2,4-triazole; 5-methoxy-1-methyltetrazole; 5-methoxy-1-phenyltetrazole; 3-methoxyisoxazole; 4-methoxyisoxazole; 5-methoxyisoxazole; 2-methoxyoxazole; 4-methoxyoxazole; 5-methoxyoxazole; 3-methoxy-1,2,4-oxadiazole; 5-methoxy-1,2,4-oxadiazole; 2-methoxy-1,3,4-oxadiazole; 3-methoxyisothiazole; 4-methoxyisothiazole; 5-methoxyisothiazole; 2-methoxythiazole; 4-methoxythiazole; 5-methoxythiazole; 2-methoxypyridine; 3-methoxypyridine; 4-methoxypyridine; 3-methoxypyridazine; 4-methoxypyridine; 2-methoxypyrimidine; 4-methoxypyrimidine; 5-methoxypyrimidine; 2-methoxypyrazine; 3-methoxy-1,2,4-triazine; 5-methoxy-1,2,4-triazine; 6-methoxy-1,2,4-triazine; 2-methoxy-1,3,5-triazine and the like.

Exemplary of compounds of Formula 4, $R^7$—O(—$R^8$—O)$_n$—$R^9$ compounds containing more than one C—O—C linkage, that may be used herein, are alkyl, alkenyl, dienyl, and aryl substituted compounds where n ranges from 1 to 30. Specific examples are, dimethoxymethane; 1,1-dimethoxyethane; 1,1,1-trimethoxyethane; 1,1,1-triethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; ethylene glycol diethyl ether; ethylene glycol divinyl ether; ethylene glycol diphenyl ether; ethylene glycol dicyclopentyl ether; ethylene glycol tert-butyl methyl ether; ethylene glycol tert-butyl ethyl ether; di(ethylene glycol) dimethyl ether; di(ethylene glycol) diethyl ether; di(ethylene glycol) dibutyl ether; di(ethylene glycol) tert-butyl methyl ether; tri (ethylene glycol) dimethyl ether; tri(ethylene glycol) diethyl ether; tetra(ethylene glycol) dimethyl ether; tetra(ethylene glycol) diethyl ether; 2-(2-ethylhexyl)-1,3-dimethoxypropane; 2-isopropyl-1,3-dimethoxypropane; 2-butyl-1,3-dimethoxypropane; 2-sec-butyl-1,3-dimethoxypropane; 2-tert-butyl-1,3-dimethoxypropane; 2-cyclohexyl-1,3-dimethoxypropane; 2-phenyl-1,3-dimethoxypropane; 2-cumyl-1,3-dimethoxypropane; 2-(2-phenylethyl)-1,3-dimethoxypropane; 2-(2-cyclohexylethyl)-1,3-dimethoxypropane; 2-(p-chlorophenyl)-1,3-dimethyoxypropane; 2-(p-fluorophenyl)-1,3-dimethoxypropane; 2-(diphenylmethyl)-1,3-dimethoxypropane; 2,2-dicyclohexyl-1,3-dimethoxypropane; 2,2-diethyl-1,3-dimethoxypropane; 2,2-dipropyl-1,3-diemthoxypropane; 2,2-diisopropyl-1,3-dimethoxypropane; 2,2-dibutyl-1,3-dimethoxypropane; 2,2-diisobutyl-1,3-dimethoxypropane; 2-methyl-2-ethyl-1,3-dimethoxypropane; 2-methyl-2-propyl-1,3-dimethoxypropane; 2-methyl-2-butyl-1,3-dimethoxypropane; 2-methyl-2-benzyl-1,3-dimethoxypropane; 2-methyl-2-methylcyclohexyl-1,3-dimethoxypropane; 2-isopropyl-2-isopentyl-1,3-dimethoxypropane; 2,2-bis(2-cyclohexylmethyl)-1,3-diemthoxypropane and the like. Also exemplary of compounds of Formula 4 containing heteroatoms from Groups 13, 14, 15, 16 and 17 of the Periodic Table of Elements are ethylene glycol bis(trimethylsilylmethyl) ether; di(ethylene glycol) methyl trimethylsilyl ether; tris(2-methoxyethyl) borate; ethylene glycol chloromethyl bromomethyl ether and the like.

Preferred for use herein as external electron donors are dimethyl ether; diethyl ether; dipropyl ether; dibutyl ether; diisoamyl ether; dibenzyl ether; butyl methyl ether; butyl ethyl ether; chloromethyl methyl ether; trimethylsilylmethyl methyl ether; bis(trimethylsilylmethyl) ether; bis(2,2,2-trifluoroethyl) ether; ethylene oxide; propylene oxide; 1,2-epoxybutane; cyclopentene oxide; epichlorohydrin; furan; 2,3-dihydrofuran; 2,5-dihydrofuran; tetrahydrofuran; 2-methyltetrahydrofuran; 2,5-dimethyltetrahydrofuran; 2-methylfuran; 2,5-dimethylfuran; tetrahydropyran; 1,2-epoxybut-3-ene; styrene oxide; 2-ethylfuran; oxazole; 1,3,4-oxadiazole; 3,4-dichloro-1,2-epoxybutane; 3,4-dibromo-1,2-epoxybutane; dimethoxymethane; 1,1-dimethoxyethane; 1,1,1-trimethoxymethane; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; di(ethylene glycol) dimethyl ether; di(ethylene glycol) diethyl ether; di(ethylene glycol) dibutyl ether; di(ethylene glycol) tert-butyl methyl ether; tri(ethylene glycol) dimethyl ether; tri(ethylene glycol) diethyl ether; tetra(ethylene glycol) dimethyl ether; 2,2-diethyl-1,3-dimethoxypropane; 2-methyl-2-ethyl-1,3-dimethoxypropane; 2-methoxyfuran; 3-methoxyfuran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 1,3-dioxane; 1,4-dioxane; 4-methyl-1,3-dioxane; 1,3,5-trioxane and 3,4-epoxytetrahydrofuran.

Most preferred for use herein as the external electron donor are tetrahydrofuran, diethyl ether, dipropyl, methyl propyl ether, dibutyl ether, dioctyl ether, trimethylene oxide and tetrahydropyran.

The polymerization process of the present invention may be carried out using any suitable process. For example, there may be utilized polymerization in suspension, in solution, in super-critical or in the gas phase media. All of these polymerization processes are well known in the art.

A particularly desirable method for producing polyethylene polymers according to the present invention is a gas phase polymerization process preferably utilizing a fluidized bed reactor. This type reactor and means for operating the reactor are well known and completely described in U.S. Pat. Nos. 3,709,853; 4,003,712; 4,011,382; 4,012,573; 4,302,566; 4,543,399; 4,882,400; 5,352,749; 5,541,270; Candadian Patent No. 991,798 and Belgian Patent No. 839,380. These patents disclose gas phase polymerization processes wherein the polymerization medium is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for us in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 110° C. In general, the reactor temperature is operated at the highest temperature that is feasible taking into account the sintering temperature of the polymer product within the reactor.

The process of the present invention is suitable for the production of homopolymers of ethylene and/or copolymers, terpolymers, and the like, of ethylene and at least one or more other olefins. Preferably the olefins are alpha-olefins. The olefins, for example, may contain from 3 to 16 carbon atoms. Particularly preferred for preparation herein by the process of the present invention are linear polyethylenes. Such linear polyethylenes are preferably linear homopolymers of ethylene and linear copolymers of ethylene and at least one alpha-olefin wherein the ethylene content is at least about 70% by weight of the total monomers involved. Exemplary alpha-olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of linear polyethylenes containing long chain branching may occur.

The polymerization reaction of the present invention is carried out in the presence of a Ziegler-Natta type catalyst. In the process of the invention, the catalyst can be introduced in any manner known in the art. For example, the catalyst can be introduced directly into the polymerization medium in the form of a solution, a slurry or a dry free flowing powder. The catalyst can also be used in the form of a deactivated catalyst, or in the form of a prepolymer obtained by contacting the catalyst with one or more olifins in the presence of a co-catalyst. In the present invention, the Ziegler-Natta type catalyst utilize contains at least one or more internal electron donor.

In preparing the Ziegler-Natta type catalyst used herein, there is incorporated at least one or more internal electron donors. There can be used any internal electron donor known in the art. The internal electron donor is incorporated in an amount represented by a molar ratio of internal electron donor to transition metal compound of the Ziegler-Natta type catalyst of from 1:1 to about 1000:1.

The Ziegler-Natta catalysts are well known in the industry. The Ziegler-Natta catalysts in the simplest form are comprised of a transition metal compound and a organometallic co-catalyst compound. The metal of the transition metal compound is a metal of Groups 4, 5, 6, 7, 8, 9 and 10 of the Periodic Table of Elements, as published in "Chemical and Engineering News", 63(5), 27, 1985. In this format, the groups are numbered 1–18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and chlorine. Such magnesium and chlorine containing catalysts may be prepared by any manner known in the art.

Any internal electron donor can be utilized in preparing the Ziegler-Natta catalyst. Illustrative of the internal electron donors are hydrocarbons containing from 1 to 50 carbon atoms and from 1 to 30 heteroatoms of an element, or mixtures thereof, selected from Groups 14, 15, 16 and 17 of the Periodic Table of Elements. Exemplary of suitable internal electron donor compounds are, for example, ethers, thioethers, amines, esters, thioesters, amides, anhydrides, acid halides, aldehydes, ketones, alcohols, nitriles, phosphines, silanes, carboxylic acids and the like.

Exemplary of ethers useful as internal electron donors are dimethyl ether: diethyl ether; dipropyl ether; diisopropyl ether; dibutyl ether; dipentyl ether; dihexyl ether; dioctyl ether; diisoamyl ether; di-tert-butyl ether; diphenyl ether; dibenzyl ether; divinyl ether; diallyl ether; dicyclopropyl ether; dicyclopentyl ether; dicyclohexyl ethel; bis(2,2,2-trifluoroethyl) ether; allyl methyl ether; allyl ethyl ether; allyl cyclohexyl ether; allyl phenyl ether; allyl benzyl ether; allyl 2-tolyl ether; allyl 3-tolyl ether; allyl 4-tolyl ether; benzyl methyl ether; benzyl ethyl ether; benzyl isoamyl ether; benzyl chloromethyl ether; benzyl cyclohexyl ether; benzyl phenyl ether; benzyl 1-naphthyl ether; benzyl 2-naphthyl ether; butyl methyl ether; butyl ethyl ether; sec-butyl methyl ether; tert-butyl methyl ether; butyl cyclopentyl ether; butyl 2-chloroethyl ether; cyclopentyl methyl ether; cyclohexyl ethyl ether; cyclohexyl vinyl ether; tert-amyl methyl ether; sec-butyl ethyl ether; tert-butyl ethyl ether; tert-amyl ethyl ether; cyclododecyl methyl ether; bis(2-cyclopenen-1-yl) ether; 1-methoxy-1,3-cyclohexadiene; 1-methoxy-1,4-cyclohexadiene; chloromethyl methyl ether; chloromethyl ethyl ether; bis(2-tolyl) ether; trimethylsilylmethyl methyl ether; trimethylene oxide; 3,3-dimethyloxetane; furan; 2,3-dihydrofuran; 2,5-dihydrofuran; tetrahydrofuran; 2-methyltetrahydrofuran; 2,5-dimethyltetrahydrofuran; 4,5-dihydro-2-methylfuran; 2-methylfuran; 2,5-dimethylfuran; 3-bromofuran; 2,3-benzofuran; 2-methylbenzofuran; dibenzofuran; isobenzofuran; xanthene; 1,2-pyran; 1,4-pyran; tetrahydropyran; 3-methyltetrahydropyran; 4-chlorotetrahydropyran; chroman; isochroman; oxocane; 1,1-dimethoxyethan; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ehylene glycol dimethyl ether; ethylene glycol diethyl ether; ethylene glycol divinyl ether; ethylene glycol diphenyl ether; ethylene glycol tert-butyl methyl ether; ethylene glycol tert-butyl ethyl ether; di(ethylene glycol) dimethyl ether; di(ethylene glycol) diethyl ether; di(ethylene glycol) dibutyl ether; di(ethylene glycol) tert-butyl methyl ether; tri(ethylene glycol) dimethyl ether; tri (ethylene glycol) diethyl ether; tetra(ethylene glycol) dimethyl ether; tetra(ethylene glycol) diethyl ether; 2,5-dimethoxyfuran; 2-methoxyfuran; 3-methoxyfuran; 2-methoxytetrahydropyran; 3-methoxytetrahydropyran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 2-vinyl-1,3-dioxolane; 2-chloromethyl-1,3-dioxolane; 2-methoxy-1,3-dioxolane; 1,4-dioxaspiro[4.4]non-6-ene; 1,4,9,12-tetraoxadispiro(4.2.4.2)tetradecane; 1,3-dioxane; 1,4-dioxane; 4-methyl-1,3-dioxane; 1,3,5-trioxane; 2,4,8,10-tetraoxaspiro(5.5)undecane, 12-crown-4; 15-crown-5; cis-4,7-dihydro-1,3-dioxepin; 2-(2-ethylhexyl)-1,3-dimethoxypropane; 2-isopropyl-1,3-dimethoxypropane; 2-butyl-1,3-dimethoxypropane; 2-sec-butyl-1,3-dimethoxypropane; 2-tert-butyl-1,3-dimethoxypropane; 2-cyclohexyl-1,3-dimethoxypropane; 2-phenyl-1,3-dimethoxypropane; 2-cumyl-1,3-dimethoxypropane; 2-(2-phenylethyl)-1,3-dimethoxypropane; 2-(2-cyclohexylethyl)-1,3-dimethoxypropane; 2-(p-chlorophenyl)-1,3-dimethoxypropane; 2-(p-fluorophenyl)-1,3-dimethoxypropane; 2-(diphenylmethyl)-1,3-dimethoxypropane; 2,2-dicyclohexyl-1,3-dimethoxypropane; 2,2-diethyl-1,3-dimethoxypropane; 2,2-dipropyl-1,3-dimethoxypropane; 2,2-diisopropyl-1,3-dimethoxypropane; 2,2-dibutyl-1,3-dimethoxypropane; 2,2-diisobutyl-1,3-dimethoxypropane; 2-methyl-2-ethyl-1,3-dimethoxypropane; 2-methyl-2-propyl-1,3-dimethoxypropane; 2-methyl-2-butyl-1,3-dimethoxypropane; 2-methyl-2-benzyl-1,3-dimethoxypropane; 2-methyl-2-methylcyclohexyl-1,3-dimethoxypropane; 2-isopropyl-2-isopentyl-1,3-dimethoxypropane; 2,2-bis(2-cyclohexylmethyl)-1,3-dimethoxypropane and the like.

Exemplary of thioethers useful as internal electron donors are dimethyl sulfide; diethyl sulfide; dipropyl sulfide; dibutyl sulfide; dipentyl sulfide; dihexyl sulfide; dioctyl sulfide; diisoamyl sulfide; di-tert-butyl sulfide; diphenyl sulfide; dibenzyl sulfide; divinyl sulfide; diallyl sulfide; dipropargyl sulfide; dicyclopropyl sulfide; dicyclopentyl sulfide; dicyclohexyl sulfide; allyl methyl sulfide; allyl ethyl sulfide; allyl cyclohexyl sulfide; allyl phenyl sulfide; allyl benzyl sulfide; allyl 2-tolyl sulfide; ally 3-tolyl sulfide; benzyl methyl sulfide; benzyl ethyl sulfide; benzyl isoamyl sulfide; benzyl chloromethyl sulfide; benzyl cyclohexyl sulfide; benzyl phenyl sulfide; benzyl 1-naphthyl sulfide; benzyl 2-naphthyl sulfide; butyl methyl sulfide; butyl ethyl sulfide; sec-butyl methyl sulfide; tert-butyl methyl sulfide; butyl cyclopentyl sulfide; butyl 2-chloroethyl sulfide; cyclopentyl methyl sulfide; cyclohexyl ethyl sulfide; cyclohexyl vinyl sulfide; tert-amyl methyl sulfide; sec-butyl ethyl sulfide; tert-butyl ethyl sulfide; tert-amyl ethyl sulfide; cyclododecyl methyl sulfide; bis(2-cyclopenten-1-yl) sulfide; 1-methylthio-1,3-cyclohexadiene; 1-methylthio-1,4-cyclohexadiene; chloromethyl methyl sulfide; chloromethyl ethyl sulfide; bis(2-tolyl) sulfide; trimethylsilylmethyl methyl sulfide; trimethylene sulfide; thiophene; 2,3-dihydrothiophene; 2,5-dihydrothiophene; tetrahydrothiophene; 2-methyltetrahydrothiophene; 2,5-dimethyltetrahydrothiophene; 4,5-dihydro-2-methylthiophene; 2-methylthiophene; 2,5-dimethyldiophene; 3-bromothiophene; 2,3-benzothiophene; 2-methylbenzothiophene; dibenzothiophene; isobenzothiophene; 1,1-bis(methylthio)ethane; 1,1,1-tris(methylthio)ethane; 1,1,2-tris(methylthio)ethane; 1,1-bis(methylthio)propane; 1,2-bis(methylthio)propane; 2,2-bis(methylthio)propane; 1,3-bis(methylthio)propane; 1,1,3-tris(methylthio)propane; 1,4-bis(methylthio)butane; 1,2-bis(methylthio)benzene; 1,3-bis(methylthio)benzene; 1,4-bis(methylthio)benzene; ethylene glycol dimethyl sulfide; ethylene glycol diethyl sulfide; ethylene glycol divinyl sulfide; ethylene glycol diphenyl sulfide; ethylene glycol tert-butyl methyl sulfide; ethylene glycol tert-butyl ethyl sulfide; 2,5-bis(methylthio)thiophene; 2-methylthiothiophene; 3-methylthiothiophene; 2-methylthiotetrahydropyran; 3-methylthiotetrahydropyran; 1,3-dithiolane; 2-methyl-1,3-dithiolane; 2,2-dimethyl-1,3-dithiolane; 2-ethyl-2-methyl-1,3-dithiolane; 2,2-tetramethylene-1,3-dithiolane; 2,2-pentamethylene-1,3-dithiolane; 2-vinyl-1,3-dithiolane; 2-chloromethyl-1,3-dithiolane; 2-methylthio-1,3-dithiolane; 1,3-dithiane; 1,4-dithiane; 4-methyl-1,3-dithiane; 1,3,5-trithiane; 2-(2-ethylhexyl)-1,3-bis(methylthio)propane; 2-isopropyl-1,3-bis (methylthio)propane; 2-butyl-1,3-bis (methylthio)propane; 2-sec-butyl-1,3-bis (methylthio)propane; 2-tert-butyl-1,3-bis(methylthio)propane; 2-cyclohexyl-1,3-bis (methylthio)propane; 2-phenyl-1,3-bis (methylthio)propane; 2-cumyl-1,3-bis (methylthio)propane; 2-(2-phenylethyl)-1,3-bis(methylthio)propane; 2-(2-cyclohexylethyl)-1,3-bis(methylthio)propane; 2-(p-chlorophenyl)-1,3-bis (methylthio)propane; 2-(p-fluorophenyl)-1,3-bis(methylthio)propane; 2-(diphenylmethyl)-1,3-bis(methylthio)propane; 2,2-dicyclohexyl-1,3-bis (methylthio)propane; 2,2-diethyl-1,3-bis(methylthio)propane; 2,2-dipropyl-1,3-bis (methylthio)propane; 2,2-diisopropyl-1,3-bis(methylthio)propane; 2,2-dibutyl-1,3-bis (methylthio)propane; 2,2-diisobutyl-1,3-bis (methylthio)propane; 2-methyl-2-ethyl-1,3-bis (methylthio)propane; 2-methyl-2-propyl-1,3-bis(methylthio)propane; 2-methyl-2-butyl-1,3-bis (methylthio)propane; 2-methyl-2-benzyl-1,3-bis(methylthio)propane; 2-methyl-2-methylcylohexyl-1,3-bis(methylthio)propane; 2-isopropyl-2-isopentyl-1,3-bis (methylthio)propane; 2,2-bis(2-cyclohexylmethyl)-1,3-bis(methylthio)propane and the like.

Exemplary of amines useful as internal electron donors are methylamine; ethylamine; propylamine; isopropylamine; butylamine; isobutylamine; amylamine; isoamylamine; octylamine; cyclohexylamine; aniline; dimethylamine; diethylamine; dipropylamine; diisopropylamine; dibutylamine; diisobutylamine; diamylamine; diisoamylamine; dioctylamine; dicyclohexylamine; trimethylamine; triethylameine; tripropylamine; triisopropylamine; tributylamine; triisobutylamine; triamylamine; triisoamylamine; trioctylamine; tricyclohexylamine; N-methylaniline; N-ethylaniline; N-propylaniline; N-isopropylaniline; N-butylaniline; N-isobutylaniline; N-amylaniline; N-isoamylaniline; N-octylaniline; N-cyclohexylaniline; N,N-dimethylaniline; N,N-diethylaniline; N,N-dipropylaniline; N,N-diisopropylaniline; N,N-dibutylaniline; N,N-diisobutylaniline; N,N-diamylaniline; N,N-diisoamylaniline; N,N-dioctylaniline; N,N-dicyclohexylaniline; azetidine; 1-methylazetidine; 1-ethylazetidine; 1propylazetidine; 1-isopropylazetidine; 1-butylazetidine; 1-isobutylazetidine; 1-amylazetidine; 1-isoamylazetidine; pyrrolidine; 1-methylpyrrolidine; 1-ethylpyrrolidine; 1-propylpyrrolidine; 1-isopropylpyrrolidine; 1-butylpyrrolidine; 1-isobutylpyrrolidine; 1-amylpyrrolidine; 1-isoamylpyrrolidine; 1-octylpyrrolidine; 1-cyclohexylpyrrolidine; 1-phenylpyrrolidine; piperidine; 1-methylpiperidine; 1-ethylpiperidine; 1-propylpiperidine; 1-isopropylpiperidine; 1-butylpiperidine; 1-isobutylpiperidine; 1-amylpiperidine;

1-isoamylpiperidine; 1-octylpiperidine; 1-cyclohexlpiperidine; 1-phenylpiperidine; piperazine; 1-methylpiperazine; 1-ethylpiperazine; 1-propylpiperazine; 1-isopropylpiperazine; 1-butylpiperazine; 1-isobutylpiperazine; 1-amylpiperazine; 1-isoamylpiperazine; 1-octylpiperazine; 1-cyclohexylpiperazine; 1-phenylpiperazine; 1,4-dimethylpiperazine; 1,4-diethylpiperazine; 1,4-dipropylpiperazine; 1,4-diisopropylpiperazine; 1,4-dibutylpiperazine; 1,4-diisobutylpiperazine; 1,4-diamylpiperazine; 1,4-diisoamylpiperazine; 1,4-dioctylpiperazine; 1,4-dicyclohexylpiperazine; 1,4-diphenylpiperazine and the like.

Exemplary of esters useful as internal electron donors are methyl formate; methyl acetate; ethyl acetate; vinyl acetate; propyl acetate; butyl acetate; isopropyl acetate; isobutyl acetate; octyl acetate; cyclohexyl acetate; ethylpropionate; ethyl valerate; methyl chloroacetate; ethyl dichloroacetate; methyl methacrylate; ethyl crotonate; ethyl pivalate; methyl benzoate; ethyl benzoate; propyl benzoate; butyl benzoate; isobutyl benzoate; isopropyl benzoate; octyl benzoate; cyclohexyl benzoate; phenyl benzoate; benzyl benzoate; methyl 2-methylbenzoate; ethyl 2-methylbenzoate; propyl 2-methylbenzoate; isopropyl 2-methylbenzoate; butyl 2-methylbenzoate; isobutyl 2-methylbenzoate; octyl 2-methylbenzoate; cyclohexyl 2-methylbenzoate; phenyl 2-methylbenzoate; benzyl 2-methylbenzoate; methyl 3-methylbenzoate; ethyl 3-methylbenzoate; propyl 3-methylbenzoate; isopropyl 3-methylbenzoate; butyl 3-methylbenzoate; isobutyl 3-methylbenzoate; octyl 3-methylbenzoate; cylohexyl 3-methylbenzoate; phenyl 3-methylbenzoate; benzyl 3-methylbenzoate; methyl 4-methylbenzoate; ethyl 4-methylbenzoate; propyl 4-methylbenzoate; isopropyl 4-methylbenzoate; butyl 4-methylbenzoate; isobutyl 4-methylbenzoate; octyl 4-methylbenzoate; cyclohexyl 4-methylbenzoate; phenyl 4-methylbenzoate; benzyl 4-methylbenzoate; methyl o-chlorobenzoate; ethyl o-chlorobenzoate; propyl o-chlorobenzoate; isopropyl o-chlorobenzoate; butyl o-chlorobenzoate; isobutyl o-chlorobenzoate; amyl o-chlorobenzoate; isoamyl o-chlorobenzoate; octyl o-chlorobenzoate; cyclohexyl o-chlorobenzoate; phenyl o-chlorobenzoate; benzyl o-chlorobenzoate; methyl m-chlorobenzoate; ethyl m-chlorobenzoate; propyl m-chlorobenzoate; isopropyl m-chlorobenzoate; butyl m-chlorobenzoate; isobutyl m-chlorobenzoate; amyl m-chlorobenzoate; isoamyl m-chlorobenzoate; octyl m-chlorobenzoate; cyclohexyl m-chlorobenzoate; phenyl m-chlorobenzoate; benzyl m-chlorobenzoate; methyl p-chlorobenzoate; ethyl p-chlorobenzoate; propyl p-chlorobenzoate; isopropyl p-chlorobenzoate; butyl p-chlorobenzoate; isobutyl p-chlorobenzoate; amyl p-chlorobenzoate; isoamyl p-chlorobenzoate; octyl p-chlorobenzoate; cyclohexyl p-chlorobenzoate; phenyl p-chlorobenzoate; benzyl p-chlorobenzoate; dimethyl maleate; dimethyl phthalate; diethyl phthalate; dipropyl phthalate; dibutyl phthalate; diisobutyl phthalate; methyl ethyl phthalate; methyl propyl phthalate; methyl butyl phthalate; methyl isobutyl phthalate; ethyl propyl phthalate; ethyl butyl phthalate; ethyl isobutyl phthalate; propyl butyl phthalate; propyl isobutyl phthalate; dimethyl terephthalate; diethyl terephthalate; dipropyl terephthalate; dibutyl terephthalate; diisobutyl terephthalate; methyl ethyl terephthalate; methyl proply terephthalate; methyl butyl terephthalate; methyl isobutyl terephthalate; ethyl propyl terephthalate; ethyl butyl terephthalate; ethyl isobutyl terephthalate; propyl butyl terephthalate; propyl isobutyl terephthalate; dimethyl isophthalate; diethyl isophthalate; dipropyl isophthalate; dibutyl isophthalate; diisobutyl isophthalate; methyl ethyl isophthalate; methyl propyl isophthalate; methyl butyl isophthalate; methyl isobutyl isophthalate; ethyl propyl isophthalate; ethyl butyl isophthalate; ethyl isobutyl isophthalate; propyl butyl isophthalate; propyl isobutyl isophthalate; and the like.

Exemplary of thioesters useful as internal electron donors are methyl thiolacetate; ethyl thiolacetate; propyl thiolacetate; isopropyl thiolacetate; butyl thiolacetate; isobutyl thiolacetate; amyl thiolacetate; isoamyl thiolacetate; octyl thiolacetate; cyclohexyl thiolacetate; phenyl thiolacetate; 2-chloroethyl thiolacetate; 3-chloropropyl thiolacetate; methyl thiobenzoate; ethyl thiobenzoate; propyl thiobenzoate; isopropyl thiobenzoate; butyl thiobenzoate; isobutyl thiobenzoate; amyl thiobenzoate; isoamyl thiobenzoate; octyl thiobenzoate; cyclohexyl thiobenzoate; phenyl thiobenzoate; 2-chloroethyl thiobenzoate; 3-chloropropyl thiobenzoate; and the like.

Exemplary of amides useful as internal electron donors are formamide; acetamide; propionamide; isobutyramide; trimethylacetamide; hexanoamide; octadecanamide; cyclohexanecarboxamide; 1-adamantanecarboxamide; acrylamide; methacrylamide; 2-fluoroacetamide; 2-chloroacetamide; 2-bromoacetamide; 2,2-dichloroacetamide; 2,2,2-triflouroacetamide; 2,2,2-trichloroacetamide; 2-chloropropionamide; benzamide; N-methylformamide; N-ethylformamide; N-propylformamide; N-butylformamide; N-isobutylformamide; N-amylformamide; N-cyclohexylformamide; formanilde; N-methylacetamide; N-ethylacetamide; N-propylacetamide; N-butylacetamide; N-isobutylacetamide; N-amylacetamide; N-cyclohexylacetamide; acetanilide; N-methylpropionamide; N-ethylpropionamide; N-propylpropionamide; N-butylpropionamide; N-isobutylpropionamide; N-amylpropionamide; N-cyclohexylpropionamide; N-phenylpropionamide; N-methylisobutyramide; N-methyltrimethylacetamide; N-methylhexanoamide; N-methyloctadecamide; N-methylacrylamide; N-methylmethacrylamide; N-methyl-2-flouroacetamide; N-methyl-2-chloroacetamide; N-methyl-2-bromoacetamide; N-methyl-2,2-dichloroacetamide; N-methyl-2,2,2-trifluoroacetamide; N-methyl-2,2,2-trichloroacetamide; N-methyl-2-chloropropionamide; N,N-dimethylformamide; N,N-diethylformamide; N,N-diisopropylformamide; N,N-dibutylformamide; N-methylformanilide; N,N-dimethylacetamide; N,N-diethylacetamide; N,N-diisopropylacetamide; N,N-dibutylacetamide; N-methylaceanilide; N,N-dimethylpropionamide; N,N-diethylpropionamide; N,N-diisopropylpropionamide; N,N-dibutylpropionamide; N,N-dimethylisobutyramide; N,N-dimethyltrimethylacetamide; N,N-dimethylhexoamide; N,N-dimethyloctadecanamide; N,N-dimethylacrylamide; N,N-dimethylmethacrylamide; N,N-dimethyl-2-fluoroacetamide; N,N-dimethyl-2-chloroacetamide; N,N-dimethyl-2-bromoacetamide; N,N-dimethyl-2,2-dichloroacetamide; N,N-dimethyl-2,2,2-trifluoroacetamide; N,N-diethyl-2,2,2-trifluoroacetamide; N,N-diisopropyl-2,2,2-trifluoroacetamide; N,N-dibutyl-2,2,2-trifluoroacetamide; N,N-dimethyl-2,2,2-trichloroacetamide; N,N-diethyl-2,2,2-trichloroacetamide; N,N-diisopropyl-2,2,2-trichloroacetamide; N,N-dibutyl-2,2,2-trichloroacetamide; N,N-dimethyl-2-chloropropionamide; 1-acetylazetidine; 1-acetylpyrrolidine; 1-acetylpiperidine; 1-acetylpiperazine; 1-acetylpiperazine; 1,4-diacetylpiperazine and the like.

Exemplary of anhydrides useful as internal electron donors are acetic anhydride; propionic anhydride, butyric anhydride; isobutyric anhydride; valeric anhydride; trimethylacetic anhydride; hexanoic anhydride; heptonoic anhydride; decanoic anhydride; lauric anhydride; myristic anhydride; palmitic anhydride; stearic anhydride; docosanoic anhydride; crotonic anhydride; methacrylic anhydride; oleic anhydride; linoleic anhydride; chloroacetic anhydride; iodoacetic anhydride; dichloroacetic anhydride; trifluoroacetic anhydride; chlorodifluoroacetic anhydride; trichloroacetic anhydride; pentafluoropropionic anhydride; heptafluorobutyric anhydride; succinic anhydride; methylsuccinic anhydride; 2,2-dimethylsuccinic anhydride; itaconic anhydride; maleic anhydride; glutaric anhydride; diglycolic anhydride; benzoic anhydride; phenylsuccinic anhydride; phenylmaleic anhydride; homophthalic anhydride; isatoic anhydride; phthalic anhydride; tetrafluorophthalic anhydride; tetrabromophthalic anhydride; and the like.

Exemplary of acid halides useful as internal electron donors are acetyl chloride; acetyl bromide; chloroacetyl chloride; dichloroacetyl chloride; trichloroacetyl chloride; trifluoroacetyl chloride; tribromoacetyl chloride; propionyl chloride; propionyl bromide; butyryl chloride; isobutyryl chloride; trimethylacetyl chloride; 3-cyclopentylpropionyl chloride; 2-chloropropionyl chloride; 3-chloropropionyl chloride; tert-butylacetyl chloride; isovaleryl chloride; hexanoyl chloride; heptanoyl chloride; decanoyl chloride; lauroyl chloride; myristoyl chloride; palmitoyl chloride; stearoyl chloride; oleoyl chloride; cyclopentanecarbonyl chloride; oxalyl chloride; malonyl dichloride; succinyl chloride glutaryl dichloride; adipoyl chloride; pimeloyl chloride; suberoyl chloride; azelaoyl chloride; sebacoyl chloride; dodecanedioyl dichloride; methoxyacetyl chloride; acetoxyacetyl chloride and the like.

Exemplary of aldehydes useful as internal electron donors are formaldehyde; acetaldehyde; propionaldehyde; isobutyraldehyde; trimethylacetaldehyde; butyraldehyde; 2-methylbutyraldehyde; valeraldehyde; isovaleraldehyde; hexanal; 2-ethylhexanal; heptaldegyde; decyl aldehyde; crotonaldehyde; acrolein; methacrolein; 2-ethylacrolein; chloroacetaldehyde; iodoacetaldehyde; dichloroacetaldehyde; trifluoroacetaldehyde; chlorodifluoroacetaldehyde; tricholoroacetaldehyde; pentafluoropropionaldehyde; heptafluorobutyraldehyde; phenylacetaldehyde; benzaldehyde; o-tolualdehyde; m-tolualdehyde; p-tolualdehyde; trans-cinnamaldehyde; trans-2-nitrocinnamaldehyde; 2-bromobenzaldehyde; 2-chlorobenzaldehyde; 3-chlorobenzaldehyde; 4-chlorobenzaldehyde and the like.

Exemplary of ketones useful as internal electron donors are acetone; 2-butanone; 3-methyl-2-butanone; pinacolone; 2-pentanone; 3-pentanone; 3-methyl-2-pentanone; 4-methyl-2-pentanone; 2-methyl-3-pentanone; 4,4-dimethyl-pentanone; 2,4-dimethyl-3-pentanone; 2,2,4,4-tetramethyl-3-pentanone; 2-hexanone; 3-hexanone; 5-methyl-2-hexanone; 2-methyl-3-hexanone; 2-heptanone; 3-heptanone; 4-heptanone; 2-methyl-3- heptanone; 5-methyl-3-heptanone; 2,6-dimethyl-4-heptanone; 2-octanone; 3-octanone; 4-octanone; acetophenone; benzophenone; mesityl oxide; hexafluoroacetone; perfluoro-2-butanone; 1,1,1-trichloroacetone and the like.

Exemplary of alcohols useful as internal electron donors are methanol; ethanol; propanol; isopropanol; butanol; isobutanol; hexanol; heptanol; octanol; dodecanol; octadecyl alcohol; 2-ethylhexyl alcohol; benzyl alcohol; cumyl alcohol; oleyl alcohol; diphenyl methanol; triphenyl methanol; phenol; cresol; ethylphenol; propylphenol; cumylphenol; naphthol; cyclopentanol; cyclohexanol and the like.

Exemplary of nitriles useful as internal electron donors are acetonitrile; propionitrile; butyronitrile; isobutyronitrile; valeronitrile; isovaleronitrile; trimethylacetonitrile; hexanenitrile; heptanenitrile; heptyl cyanide; octyl cyanide; undecanenitrile; malonitrile; succinitrile; glutaronitrile; adiponitrile; sebaconitrile; allyl cyanide; acrylonitrile; crotonitrile; methacrylonitrile; fumaronitrile; tetracyanoethylene; cyclopentanecarbonitrile; cyclohexanecarbonitrile; dichloroacetonitrile; fluoroacetonitrile; trichloroacetonitrile; benzonitrile; benzyl cyanide; 2-methylbenzyl cyanide; 2-chlorobenzonitrile; 3-chlorobenzonitrile; 4-chlorobenzonitrile; o-tolunitrile; m-tounitrile; p-tolunitrile; and the like.

Exemplary of phosphines useful as internal electron donors are trimethylphosphine; triethylphosphine; trimethyl phosphite; triethyl phosphite; hexamethylphosphorus triamide; hexamethylphosphoramide; tripiperidinophosphine oxide; triphenylphosphine; tri-p-tolylphosphine; tri-m-tolylphosphine; tri-o-tolylphosphine; methyldiphenylphosphine; ethyldiphenylphosphine; isopropyldiphenylphosphine; allyldiphenylphosphine; cyclohexyldiphenylphosphine; benzyldiphenylphosphine; di-tert-butyl dimethylphosphoramidite; di-tert-butyl diethylphosphoramidite; di-tert-butyl diisopropylphosphoramidite; diallyl diisopropylphosphoramidite and the like.

Exemplary of silanes useful as internal electron donors are tetramethyl orthosilicate; tetraethyl orthosilicate; tetrapropyl orthosilicate; tetrabutyl orthosilicate; trichloromethoxysilane; trichloroethoxysilane; trichloropropoxysilane; trichloroisopropoxysilane; trichlorobutoxysilane; trichloroisobutoxysilane; dichlorodimethoxysilane; dichlorodiethoxysilane; dichlorodipropoxysilane; dichlorodiisopropoxysilane; dichlorodibutoxysilane; dichlorodiisobutoxysilane; chlorotrimethoxysilane; chlorotriethoxysilane; chlorotripropoxysilane; chlorotriisopropoxysilane; chlorotributoxysilane; chlorotriisobutoxysilane; dimethylmethoxysilane; diethylmethoxysilane; dipropylmethoxysilane; diisopropylmethoxysilane; dibutylmethoxysilane; diisobutylmethoxysilane; dipentylmethoxysilane; dicyclopentylmethoxysilane; dihexylmethoxysilane; dicyclohexylmethoxysilane; diphenylmethoxysilane; dimethylethoxysilane; diethylethoxysilane; dipropylethoxysilane; diisopropylethoxysilane; dibutylethoxysilane; diisobutylethoxysilane; dipentylethoxysilane; dicyclopentylethoxysilane; dihexylethoxysilane; dicyclohexylethoxysilane; diphenylethoxysilane; trimethylmethoxysilane; triethylmethoxysilane; tripropylmethoxysilane; triisopropylmethoxysilane; tributylmethoxysilane; triisobutylmethoxysilane; tripentylmethoxysilane; tricyclopentylmethoxysilane; trihexylmethoxysilane; tricyclohexylmethoxysilane; triphenylmethoxysilane; trimethylethoxysilane; triethylethoxysilane; tripropylethoxysilane; triisopropylethoxysilane; tributylethoxysilane; triisobutylethoxysilane; tripentylethoxysilane; tricyclopentylethoxysilane; trihexylethoxysilane; tricyclohexylethoxysilane; triphenylethoxysilane; dimethyldimethoxysilane; diethyldimethocysilane; dipropyldimethoxysilane; diisopropyldimethoxysilane; dibutyldimethoxysilane; diisobutyldimethoxysilane; dipentyldimethoxysilane; dicyclopentyldimethoxysilane; dihexyldimethoxysilane; dicyclohexyldimethoxysilane; diphenyldimethoxysilane; dimethyldiethoxysilane; diethyldiethoxysilane; dipropyldiethoxysilane; diisopropyldiethoxysilane; dibutyldiethoxysilane; diisobutyldiethoxysilane; dipentyldiethoxysilane; dicyclopentyldiethoxysilane; dihexyldiethoxysilane; dicyclohexyldiethoxysilane; diphenyldiethoxysilane; cyclopentylmethyldimethoxysilane; cyclopentylethyldimethoxysilane; cyclopentylpropyldimethoxysilane; cyclopentylmethyldiethoxysilane; cyclopentylethyldiethoxysilane; cyclopentylpropyldiethoxysilane; cyclohexylmethyldimethoxysilane; cyclohexylethyldimethoxysilane; cyclohexylpropyldimethoxysilane; cyclohexylmethyldiethoxysilane; cyclohexylethyldiethoxysilane; cyclohexylpropyldiethoxysilane; methyltrimethoxysilane; ethyltrimethoxysilane; vinyltrimethoxysilane; propyltrimethoxysilane; isopropyltrimethoxysilane; butyltrimethoxysilane; isobutyltrimethoxysilane; tert-butyltrimethoxysilane; phenyltrimethoxysilane; norbornanetrimethoxysilane; methyltriethoxysilane; ethyltriethoxysilane; vinyltriethoxysilane; propyltriethoxysilane; isopropyltriethoxysilane; butyltriethoxysilane; isobutyltriethoxysilane; tert-butyltriethoxysilane; phenyltriethoxysilane; norbornanetriethoxysilane; 2,3-dimethyl-2-(trimethoxysilyl)butuane; 2,3-dimethyl-2-(triethoxysilyl) butane; 2,3-dimethyl-2-tripropoxysilyl)butane; 2,3-dimethyl-2-(triisopropoxysilyl)butane; 2,3-dimethyl-2-(trimethoxysilyl)pentane; 2,3-dimethyl-2-(triethoxysilyl)pentane; 2,3- dimethyl-2-(tripropoxysilyl)pentane; 2,3-dimethyl-2-(triisopropoxysilyl)pentane; 2-methyl-3-ethyl-2-(trimethoxysilyl)pentane; 2-methyl-3-ethyl-2-(triethoxysilyl)pentane; 2-methyl-3-ethyl-2-(tripropoxysilyl)pentane; 2-methyl-3-ethyl-2-(triisopropoxysilyl)pentane; 2,3,4-trimethyl-2-(trimethoxysilyl) pentane; 2,3,4-trimethyl-2-(triethoxysilyl) pentane; 2,3,4-trimethyl-2-(tripropoxysilyl)pentane; 2,3,4-trimethyl-2-(triisopropoxysilyl)pentane; 2,3-dimethyl-2-(trimethoxysilyl)hexane; 2,3-dimethyl-2-(triethoxysilyl) hexane; 2,3-dimethyl-2-(tripropoxysilyl)hexane; 2,3-dimethyl-2-(triisopropoxysilyl)hexane; 2,4-dimethyl-3-ethyl-2-(trimethoxysilyl)pentane; 2,4-dimethyl-3-ethyl-2-(triethoxysilyl)pentane; 2,4-dimethyl-3-ethyl-2-(tripropoxysilyl)pentane; 2,4-dimethyl-3-ethyl-2-(triisopropoxysilyl)pentane; 2,4-dimethyl-3-isopropyl-2-(trimethoxysilyl)pentane; 2,4-dimethyl-3-isopropyl-2-(triethoxysilyl)pentane; 2,4-dimethyl-3-isopropyl-2-(tripropoxysilyl)pentane; 2,4-dimethyl-3-isopropyl-2-(triisopropoxysilyl)pentane; hexamethyldisiloxane; 1,1,1,3,3,3,-hexamethyldisilazane and the like.

Exemplary of carboxylic acids useful as internal electron donors are formic acid; acetic acid; propionic acid; butyric acid; valerica acid; hexanoic acid; heptanoic acid; octanoic acid; nonanoic acid; decanoic acid; lauric acid; myristic acid; palmitic acid; stearic acid; eicosanoic acid; heneicosanoic acid; heptacosanoic acid; isobutyric acid; 2-ethylbutyric acid; trimethylacetic acid; 2-methylbutyric acid; 2,2-dimethylbutyric acid; oxalic acid; malonic acid; methylmalonic acid; ethylmalonic acid; butylmalonic acid; dimethylmalonic acid; succinic acid; 2-methylsuccinic acid; 2,2-dimethylsuccinic acid; 2-ethyl-2-methylsuccinic acid; 2,3-dimethylsuccinic acid; glutaric acid; 2-methylglutaric acid; 3-methylglutaric acid; 2,2-dimethylglutaric acid; 2,3-dimethylglutaric acid; 3,3-dimethylglutaric acid; acrylic acid; methacrylic acid; crotonic acid; vinylacetic acid; tiglic acid; 6-heptenoic acid; citronellic acid; chloroacetic acid; dichloroacetic acid; trichloroacetic acid; fluoroacetic acid; difluoroacetic acid; trifluoroacetic acid; chlorodifluoroacetic acid; benzoic acid; o-toluic acid; m-toluic acid; p-toluic acid; 2-fluorobenzoic acid; 3-flurobenzoic acid; 4-fluorobenzoic acid; 2-ethoxybenzoic acid; 3-ethoxybenzoic acid; 4-ethoxybenzoic acid; 2-methoxybenzoic acid; 3-methoxybenzoic acid; 4-methoxybenzoic acid; 2-ethylbenzoic acid; 3-ethylbenzoic acid; 4-ethylbenzoic acid; 4-vinylbenzoic acid; 2-propylbenzoic acid; 2-isopropylbenzoic acid; 2-butylbenzoic acid; 2-isobutylbenzoic acid; 2-tert-butylbenzoic acid and the like.

Mixtures of two or more of the above compounds can also be used herein as internal electron donors.

The co-catalyst added to the polymerization medium of the present invention is trimethylaluminum (TMA).

In the event that a prepolymerized form of the catalyst is to be employed then the organometallic co-catalyst compound used to form the prepolymer can be any organometallic compound containing a metal of Groups 1, 2, 11, 12, 13 and 14 of the above described Periodic Table of the Elements. Exemplary of such metals are lithium, magnesium, cooper, zinc, boron, silicon and the like. However, when a prepolymer is employed, TMA is still utilized as the co-catalyst in the polymerization medium.

The catalyst system may contain other conventional components in addition to the internal electron donors, the transition metal component, the external electron donors defined herein and the TMA co-catalyst component. For example, there may be added any magnesium compound known in the art, any halogenated hydrocarbon(s), and the like.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyethylene.

In carrying out the polymerization process of the present invention, TMA is added to the polymerization medium in any amount sufficient to effect production of the desired polyethylene. It is preferred to incorporate the TMA in a molar ratio of TMA to transition metal component of the Ziegler-Natta catalyst ranging from about 1:1 to about 100:1. In a more preferred embodiment, the molar ratio of TMA to transition metal component ranged from about 1:1 to about 50:1.

In carrying out the polymerization process of the present invention the external electron donor is added in any manner. For example, the external electron donor may be added to the preformed catalyst, to the prepolymer during the prepolymerization step, to the preformed prepolymer and/or to the polymerization medium. The external electron donor may optionally be premixed with the TMA co-catalyst. The external electron donor is added in any amount sufficient to effect production of the desired polyethylene. It is preferred to incorporate the external electron donor in a molar ratio of external electron donor to transition metal component of the Ziegler-Natta catalyst ranging from about 0.01:1 to about 100:1. In a more preferred embodiment, the molar ratio of external electron donor to transition metal component ranges from about 0.1:1 to about 50:1.

In carrying out the polymerization process of the present invention, there may be added other conventional additives generally utilized in processes for polymerizing olefins. Specifically there may be added any halogenated hydrocardon, including those mentioned hereinbefore, and preferable, chloroform. The molar ratio of halogenated hydrocarbon to transition metal component of the Ziegler-Natta catalyst ranges preferably from about 0.001:1 to about 1:1.

The molecular weight of the polyethylene produced by the present invention can be controlled in any known manner, for example, by using hydrogen. The molecular weight control may be evidenced by an increase in the melt index ($I_2$) of the polymer when the molar ratio of hydrogen to ethylene in the polymerization medium is increased.

The polyethylenes of the present invention may be fabricated into films by any technique known in the art. The example, films may be produced by the well known cast film, blown film and extrusion coating techniques.

Further, the polyethylenes may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

Polymerization Process

The polymerization process utilized in the Examples is carried out in a fluidized-bed reactor or gas-phase polymerization, consisting of a vertical cylinder of diameter 0.9 meters and height 6 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and heat transfer means such as a heat exchanger. In particular the lines for supplying ethylene, an olefin such as 1-butene, 1-pentene and 1-hexene, hydrogen and nitrogen, which represent the main constituents of the gaseous reaction mixture passing through the fluidized bed, feed into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 290 psig to about 300 psig with an ascending fluidization speed, referred to herein as fluidization velocity, ranging from about 1.8 feet per second to about 2.0 feet per second.

Furthermore, in each of the Examples, a Ziegler-Natta catalyst containing an internal electron donor is introduced intermittently into the reactor. The said catalyst contains magnesium, chlorine, titanium and an internal electron donor. The rate of introduction of the catalyst into the reactor is adjusted for each given set of conditions in achieving the desired production rate. During the polymerization, a solution of trimethylaluminum (TMA) in n-hexane is introduced continuously into the line for recycling the gaseous reaction mixture, at a point situated downstream of the heat transfer means. The feed rate of TMA is expressed as a molar ratio of TMA to titanium (TMA/Ti), and is defined as the ratio of the TMA feed rate (in moles of TMA per hour) to the catalyst feed rate (in moles of titanium per hour). Simultaneously, a solution of chloroform ($CHCl_3$) in n-hexane, at a concentration of about 0.5 weight percent, is introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the catalyst feed rate (in moles of titanium per hour).

The feed rate of external electron donor (eED) is expressed as a molar ratio of eED to titanium (eED/Ti), and is defined as the ratio of the eED feed rate (in moles of eED per hour) to the catalyst feed rate (in moles of titanium per hour).

The productivity of the catalyst (Productivity) is the ratio of pounds of polyethylene produced per pound of catalyst added to the reactor. The activity of the catalyst is expressed as grams of polyethylene per millimole titanium per hour per bar of ethylene pressure.

Example 1

Preparation of LLDPE with TMA as Co-Catalyst and with THF as External Electron Donor Utilizing a Ziegler-Natta Catalyst Containing THF as Internal Electron Donor.

To the polymerization medium described above, containing ethylene, 1-hexene, hydrogen, and nitrogen, is added a Ziegler-Natta type catalyst containing magnesium, titanium, chlorine and THF (tetrahydrofuran) as an internal electron donor. TMA is added in an amount sufficient to activate the Ziegler-Natta catalyst. THF is added as the external electron donor to the polymerization process. A linear polyethylene is obtained.

Example 2

Preparation of LLDPE with TMA as Co-Catalyst and with Dibutyl Ether as External Electron Donor Utilizing a Ziegler-Natta Catalyst Containing Dibutylphthalate as Internal Electron Donor.

The process of Example 1 is followed with the exception that dibutyl ether is added as the external electron donor and the Ziegler-Natta catalyst contains dibutylphthalate as the internal electron donor. A linear polyethylene is obtained.

Example 3

Preparation of LLDPE with TMA as Co-Catalyst and with Methyl Phenyl Ether as External Electron Donor Utilizing a Ziegler-Natta Catalyst Containing Tetraethylorthosilicate as Internal Electron Donor.

The process of Example 1 is followed with the exception that methyl phenyl ether is added as the external electron donor and the Ziegler-Natta catalyst contains tetraethylorthosilicate as the internal electron donor. A linear polyethylene is obtained.

Example 4

Preparation of LLDPE with TMA as Co-Catalyst and with 1,3-Dimethoxypropane as External Electron Donor Utilizing a Ziegler-Natta Catalyst Containing Ethanol as Internal Electron Donor.

The process of Example 1 is followed with the exception that 1,3-dimethoxypropane is added as the external electron donor and the Ziegler-Natta catalyst contains ethanol as the internal electron donor. A linear polyethylene is obtained.

Example 5

Preparation of LLDPE with TMA as Co-Catalyst and with THF as External Electron Donor Utilizing a Ziegler-Natta Catalyst Containing N,N-Dimethylformamide as Internal Electron Donor.

The process of Example 1 is followed with the exception that the Ziegler-Natta catalyst contains N,N-dimethylformamide as the internal electron donor. A linear polyethylene is obtained.

Example 6

Preparation of LLDPE with TMA as Co-Catalyst and with tert-Butyl Methyl Ether as External Electron Donor Utilizing a Ziegler-Natta Catalyst Containing Hexamethylphosphourus triamide as Internal Electron Donor.

The process of Example 1 is followed with the exception that tert-butyl methyl ether is added as the external electron donor and the Ziegler-Natta catalyst contains hexamethylphosphorus triamide as the internal electron donor. A linear polyethylene is obtained.

Example 7
Preparation of LLDPE with TMA as Co-Catalyst and with tert-Butyl Methyl Ether as External Electron Donor Utilizing a Ziegler-Natta Catalyst Containing N,N-Diisopropylaniline as Internal Electron Donor.

The process of Example 1 is followed with the exception that tert-butyl methyl ether is added as the external electron donor and the Ziegler-Natta catalyst contains N,N-diiopropylaniline as the internal electron donor. A linear polyethylene is obtained.

Example 8
Preparation of LLDPE with TMA as Co-Catalyst and with Diethyl Ether as External Electron Donor Utilizing a Ziegler-Natta Catalyst Containing Trifluoroacetaldehyde as Internal Electron Donor.

The process of Example 1 is followed with the exception that diethyl ether is added as the external electron donor and the Ziegler-Natta catalyst contains trifluoroacetaldehyde as the internal electron donor. A linear polyethylene is obtained.

Example 9
Preparation of LLDPE with TMA as Co-Catalyst and with Diisopropyl Ether as External Electron Donor Utilizing a Ziegler-Natta Catalyst Containing Pinacolone as Internal Electron Donor.

The process of Example 1 is followed with the exception that diisopropyl ether is added as the external electron donor and the Ziegler-Natta catalyst contains pinacolone as the internal electron donor. A linear polyethylene is obtained.

Example 10
Preparation of LLDPE with TMA as Co-Catalyst and with THF as External Electron Donor Utilizing a Ziegler-Natta Catalyst Containing Acetonitrile as Internal Electron Donor.

The process of Example 1 is followed with the exception that THF is added as the external electron donor and the Ziegler-Natta catalyst contains acetonitrile as the internal electron donor. A linear polythylene is obtained.

Films can be readily prepared from the polyethylenes of the present invention by any method known in the art for producing films.

Articles such as molded items can also be prepared from the polyethylenes of the present invention.

It should be clearly understood that the forms of the invention herein described are illustrative only and are not intended to limit the scope of the invention. The present invention includes all modifications falling within the scope of the following claims.

We claim:

1. A process for polymerizing ethylene and/or ethylene and at least one or more other olefin(s) comprising contacting, under polymerization conditions, the ethylene and/or ethylene and at least one or more other olefin(s) with a Ziegler-Natta catalyst containing at least one or more internal electron donor, wherein the internal electron donor is present in an amount represented by a molar ratio of internal electron donor to transition metal compound of the Ziegler-Natta catalyst of from 1:1 to about 1000:1, trimethylaluminum and at least one or more external electron donor compound containing at least one carbon-oxygen-carbon linkage (C—O—C) selected from the group consisting of Formula 1, $R^1$—$CH_2$—O—$CH_2$—$R^2$, Formula 2, $R^3$—O—$R^4$, Formula 3, $R^5$—O—$R^6$, and Formula 4, $R^7$—O(—$R^8$—O)$_n$—$R^9$, where n ranges from 1 to 30, $R^1$ and $R^2$ are independently selected from the group consisting of hydrogen, saturated and unsaturated aliphatic groups containing from 1 to 30 carbon atoms and from 0 to 30 hetroatoms of an element, or mixtures thereof, selected from Groups 13, 14, 15, 16 and 17 of the Periodic Table of the Elements, and substituted and unsubstituted aromatic groups containing from 1 to 30 carbon atoms and from 0 to 30 heteratoms of an element, or mixtures thereof, selected from Groups 13, 14, 15, 16 and 17 of the Periodic Table of the Elements, $R^3$ and $R^4$ are linked and form part of a cyclic or polycyclic structure and are hydrocarbons independently selected from the group consisting of saturated and unsaturated aliphatic groups containing from 1 to 30 carbon atoms and from 0 to 30 heteroatoms of an element, or mixtures thereof, selected from Groups 13, 14, 15, 16 and 17 of the Periodic Table of the Elements, and substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of the Elements, $R^5$ is selected from the group consisting of substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of the Elements, and $R^6$, $R^7$, $R^8$ and $R^9$ are independently selected from the group consisting of saturated and unsaturated aliphatic groups containing from 1 to 30 carbon atoms and from 0 to 30 heteroatoms of an element, or mixtures thereof, selected from Groups 13, 14, 15, 16 and 17 of the Periodic Table of the Elements, and substituted and unsubstituted aromatic groups containing from 1 to 30 carbon atoms and from 0 to 30 heteroatoms of an element, or mixtures thereof, selected from Groups 13, 14, 15, 16 and 17 of the Periodic Table of the Elements.

2. The process according to claim 1 wherein at least one or more internal electron donor is selected from the group consisting of ethers, thioethers, amines, esters, thioesters, amides, anhydrides, acid halides, aldehydes, ketones, alcohols, nitriles, phosphines, silanes and carboxylic acids.

3. The process according to claim 2 wherein at least one or more internal electron donor is selected from the group consisting of ethers, esters, alcohols and silanes.

4. The process according to claim 1 wherein the at least one or more external electron donor compound is selected from the group consisting of tetrahydrofuran, diethyl ether, dipropyl ether, methyl propyl ether, dibutyl ether, dioctyl ether, trimethylene oxide and tetrahydropyran.

5. The process according to claim 1 further comprising the presence of a halogenated hydrocarbon.

6. The process according to claim 5 wherein the halogenated hydrocarbon is chloroform.

7. The process according to claim 1 wherein the Ziegler-Natta catalyst comprises a transition metal compound wherein the metal is selected from metals of Groups 4, 5, 6, 7, 8, 9 and 10 of the Periodic Table of the Elements, as defined herein.

8. The process according to claim 7 wherein the metal of the transition metal compound is selected from the group consisting of titanium, zirconium, vanadium and chromium.

9. The process according to claim 8 wherein the metal of the transition metal compound is titanium.

10. The process according to claim 1 further comprising the presence of magnesium and chlorine incorporated in the Ziegler-Natta catalyst.

11. The process according to claim 7 further comprising the presence of magnesium and chlorine incorporated in the Ziegler-Natta catalyst.

12. The process according to claim 5 wherein the halogenated hydrocarbon is added in a molar ratio of halogenated hydrocarbon to transition metal component of the Ziegler-Natta catalyst ranging from about 0.001:1 to about 1:1.

13. The process according to claim 1 wherein trimethylaluminum is added in a molar ratio of trimethylaluminum to transition metal component of the Ziegler-Natta catalyst ranging from about 1:1 to about 100:1.

14. The process according to claim 13 wherein the molar ratio of trimethylaluminum to transition metal component of the Ziegler-Natta catalyst ranges from about 1:1 to about 50:1.

15. The process according to claim 1 wherein the external electron donor compound is added in a molar ratio of external electron donor compound to transition metal component of the Ziegler-Natta catalyst ranging from about 0.01:1 to about 100:1.

16. The process according to claim 15 wherein the molar ratio of external electron donor compound to transition metal component of the Ziegler-Natta catalyst ranges from about 0.1:1 to about 50:1.

17. The process according to claim 1 wherein the polymerization conditions are gas phase.

18. The process according to claim 1 wherein the polymerization conditions are solution phase.

19. The process according to claim 1 wherein the polymerization conditions are slurry phase.

20. The process according to claim 1 wherein the at least one or more other olefin(s) is an olefin having 3 to 16 carbon atoms.

21. The process according to claim 20 wherein the at least one or more other olefin(s) is selected from the group consisting of 1-ocetene, 1-hexene, 4-methylpent-1-ene, 1-pentene, 1-butene and propylene.

22. The process according to claim 1 wherein the copolymer resulting from the polymerization of ethylene and at least one or more olefin(s) comprises ethylene in an amount of at least about 70% by weight of the copolymer.

23. The process according to claim 1 wherein the Ziegler-Natta catalyst comprises titanium, magnesium and chlorine.

24. The process according to claim 23 further comprising the presence of a halogenated hydrocarbon.

25. The process according to claim 23 wherein the polymerization conditions are gas phase.

* * * * *